US011841690B2

(12) United States Patent
Sun et al.

(10) Patent No.: US 11,841,690 B2
(45) Date of Patent: Dec. 12, 2023

(54) PROCESSING METHOD AND SYSTEM FOR AUTOMATICALLY GENERATING MACHINING FEATURE

(71) Applicant: INDUSTRIAL TECHNOLOGY RESEARCH INSTITUTE, Hsinchu (TW)

(72) Inventors: Jia-Cheng Sun, Tianzhong Township (TW); Ci-Rong Huang, Nantou (TW); Yang-Lun Liu, New Taipei (TW); Chen-Yu Kai, Ligang Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 420 days.

(21) Appl. No.: 17/170,312

(22) Filed: Feb. 8, 2021

(65) Prior Publication Data
US 2022/0214654 A1    Jul. 7, 2022

(30) Foreign Application Priority Data

Jan. 5, 2021 (TW) ................................. 110100257

(51) Int. Cl.
*G05B 17/02* (2006.01)
*G06F 30/20* (2020.01)
(Continued)

(52) U.S. Cl.
CPC .............. *G05B 17/02* (2013.01); *G06F 30/10* (2020.01); *G06F 30/20* (2020.01); *G06F 2111/10* (2020.01)

(58) Field of Classification Search
CPC . G06F 30/20; G06F 30/10; G05B 2219/3625; G05B 19/4097
See application file for complete search history.

(56) References Cited

U.S. PATENT DOCUMENTS 5,917,726 A    6/1999  Pryor
6,112,133 A    8/2000  Fishman
(Continued)

FOREIGN PATENT DOCUMENTS

CN       1871563 A    11/2006
CN    101231517 B     6/2011
(Continued)

OTHER PUBLICATIONS

Al-Sahib et al., Tool Path Optimization of Drilling Sequence in CNC Machine Using Genetic Algorithm, Innovative Systems Design and Engineering, 2014, vol. 5, No. 1, pp. 15-26.
(Continued)

*Primary Examiner* — Vincent H Tran
(74) *Attorney, Agent, or Firm* — Birch, Stewart, Kolasch & Birch, LLP

(57) ABSTRACT

A processing method for automatically generating machining features is provided. A workpiece CAD file is obtained to perform a CAD numerical analysis on a blank body. With the workpiece CAD file being used as a target, a workpiece CAD appearance is compared with the blank body to obtain a feature identification result of a first to-be-processed blank body, which includes identifying data of a to-be-removed blank body and a feature of a first processing surface. A geometric analysis is performed on the first processing surface feature and a tool selection range is determined. A virtual cutting simulation is performed on the first processing surface to generate a processed area data and an unprocessed area data. A spatial coordinate mapping comparison between the unprocessed area data and a surface data of the workpiece CAD file is performed to obtain a feature identification result of a second to-be-processed blank body.

16 Claims, 6 Drawing Sheets

(51) Int. Cl.
*G06F 30/10* (2020.01)
*G06F 111/10* (2020.01)

(56) References Cited

U.S. PATENT DOCUMENTS

| | | | |
|---|---|---|---|
| 10,564,626 B2 | 2/2020 | Nelaturi et al. | |
| 2003/0114945 A1* | 6/2003 | Hirano | G05B 19/4097 700/182 |
| 2007/0093930 A1 | 4/2007 | Griggs et al. | |
| 2010/0305745 A1* | 12/2010 | Iriguchi | G05B 19/4097 700/186 |
| 2011/0080412 A1* | 4/2011 | Miyata | G06T 19/20 345/473 |
| 2011/0257778 A1* | 10/2011 | Takahashi | G05B 19/4069 700/104 |
| 2013/0282162 A1 | 10/2013 | Griggs et al. | |
| 2014/0163720 A1 | 6/2014 | Nelaturi et al. | |
| 2015/0039122 A1* | 2/2015 | Barakchi Fard | G05B 19/19 700/186 |
| 2016/0019270 A1 | 1/2016 | Jones et al. | |
| 2017/0308057 A1 | 10/2017 | Kreidler | |
| 2020/0064809 A1* | 2/2020 | Sanders | G06F 30/17 |
| 2021/0373528 A1* | 12/2021 | Sanders | G05B 19/4097 |
| 2021/0397142 A1* | 12/2021 | Lovell | G05B 19/4099 |

FOREIGN PATENT DOCUMENTS

| | | |
|---|---|---|
| CN | 103765334 A | 4/2014 |
| CN | 103412515 B | 5/2015 |
| CN | 105022343 A | 11/2015 |
| CN | 103713579 B | 7/2016 |
| CN | 107065779 A | 8/2017 |
| CN | 106843156 B | 4/2019 |
| EP | 1 209 544 A1 | 5/2002 |
| JP | 6-119031 A | 4/1994 |
| JP | 2006068901 A * | 3/2006 ....... G05B 19/40931 |
| TW | 201813606 A | 4/2018 |
| TW | 202014814 A | 4/2020 |
| WO | WO 2012/058959 A1 | 5/2012 |
| WO | WO 2015/096511 A1 | 7/2015 |

OTHER PUBLICATIONS

Babic et al., "A review of automated feature recognition with rule-based pattern recognition", ScienceDirect, Computers in Industry, 2008, vol. 59, pp. 321-337.

McCormack et al., "Process Planning Using Adjacency-Based Feature Extraction", Int J Adv Manuf Technol, 2002, vol. 20, pp. 817-823.

Narooei et al., "Tool Routing Path Optimization for Multi-Hole Drilling Based on Ant Colony Optimization", World Applied Sciences Journal, 2014, vol. 32, No. 9, pp. 1894-1898.

Song et al., "Automatic recognition and suppression of holes on mold bases for finite element applications", Engineering with Computers, 2019, vol. 35, pp. 925-944.

Wang et al., "An Adaptive Parameter Tuning Method with On-machine Weight Identification Function for CNC Machine Tools", Applied Mechanics and Materials, 2014, vols. 479-480, Trans Tech Publications, Switzerland, pp. 268-273.

* cited by examiner

PROCESSING METHOD AND SYSTEM FOR AUTOMATICALLY GENERATING MACHINING FEATURE

This application claims the benefit of Taiwan application Serial No. 110100257, filed Jan. 5, 2021, the subject matter of which is incorporated herein by reference.

BACKGROUND OF THE DISCLOSURE

Field of the Disclosure

The disclosure relates in general to a processing method and a system for automatically generating machining features.

Description of the Related Art

Most of the computer aided design/manufacturing (CAD/CAM) based machining path programming software requires those who are versed with the manufacturing process to perform manual feature selection to plan a machining path that meets the requirements of machining cost. Despite already having the function of blank reference and tool reference, the currently available CAD/CAM based machining path programming software is still unable to automatically select the machining features. To overcome the problems encountered in the automation and optimization of path programming, the machining features required in the programming of machining path needs to be analyzed to meet the requirements of machining cost and production efficiency.

SUMMARY OF THE DISCLOSURE

The disclosure is directed to a processing method and a system for automatically generating machining features capable of identifying machining features and improving the conventional manufacturing process, meanwhile, providing suitable tool analysis as a machining basis for the complete machining process.

According to one embodiment of the present disclosure, a processing method for automatically generating machining features is provided. The processing method includes following steps. A workpiece CAD file is obtained to perform a CAD numerical analysis on a blank body. With the workpiece CAD file being used as a target, a workpiece CAD appearance is compared with the blank body to obtain a feature identification result of a first to-be-processed blank body, wherein the feature identification result of the first to-be-processed blank body includes identifying data of a to-be-removed blank body and a feature of a first processing surface. A geometric analysis is performed on the feature of the first processing surface and a tool selection range is determined. A virtual cutting simulation is performed on the first processing surface according to the tool selection range to generate a processed area data and an unprocessed area data. A spatial coordinate mapping comparison between the unprocessed area data and a surface data of the workpiece CAD file is performed to obtain a feature identification result of a second to-be-processed blank body.

According to another embodiment of the present disclosure, a processing system for automatically generating machining features is provided. The processing system includes a blank body identification module, a geometric data analysis module, a machining tool analysis module and a cutting simulation module. The blank body identification module is used to obtain a workpiece CAD file to perform a CAD numerical analysis on a blank body, and, with the workpiece CAD file being used as a target, compare a workpiece CAD appearance with the blank body to obtain a feature identification result of a first to-be-processed blank body, wherein the feature identification result of the first to-be-processed blank body includes identifying data of a to-be-removed blank body and a feature of a first processing surface. The geometric data analysis module performs a geometric analysis according to the feature of the first processing surface. The machining tool analysis module is used to confirm the tool selection range for processing the first processing surface. The cutting simulation module is used to perform a virtual cutting simulation on the first processing surface according to the tool selection range to generate a processed area data and an unprocessed area data. Besides, the blank body identification module performs a spatial coordinate mapping comparison between the unprocessed area data and a surface data of the workpiece CAD file to obtain a feature identification result of a second to-be-processed blank body.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

Detailed descriptions of the disclosure are disclosed below with a number of embodiments. However, the disclosed embodiments are for explanatory and exemplary purposes only, not for limiting the scope of protection of the disclosure. Similar/identical designations are used to indicate similar/identical elements. Directional terms such as above, under, left, right, front or back are used in the following embodiments to indicate the directions of the accompanying drawings, not for limiting the present disclosure.

Figure 1:
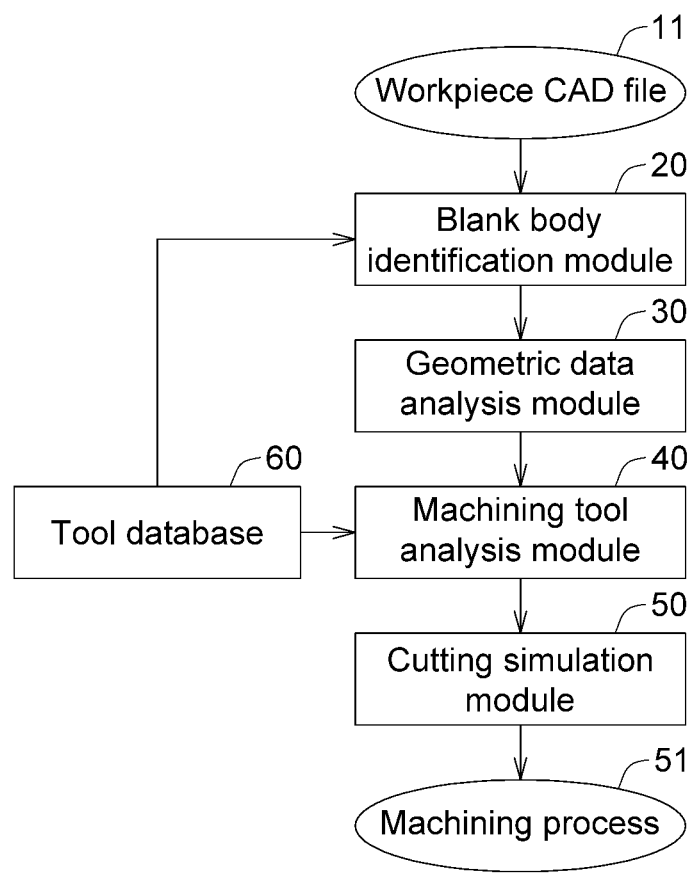
FIG. 1 is a schematic diagram of a processing system for automatically generating machining features according to an embodiment of the present disclosure.
Figure 2:
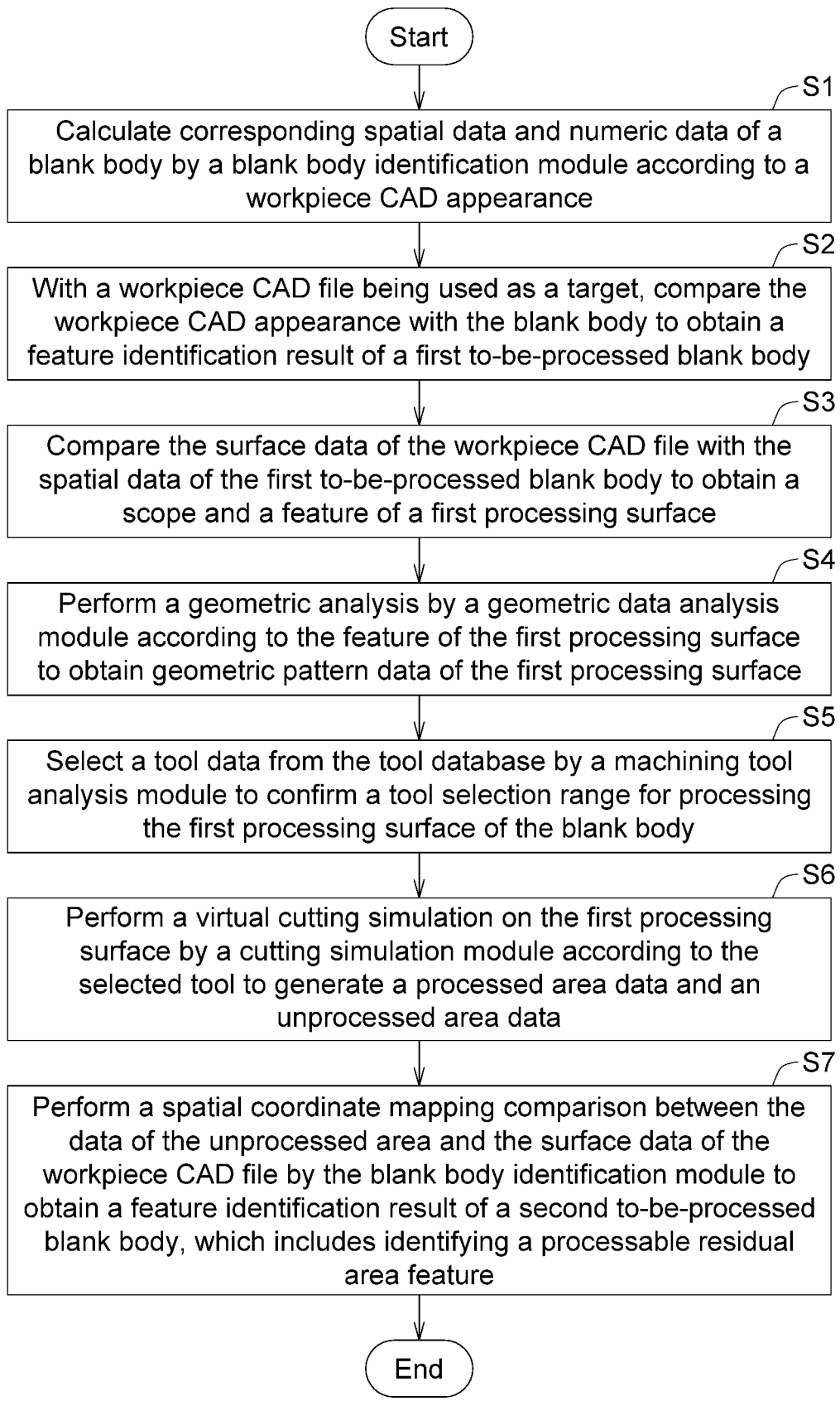
FIG. 2 is a schematic diagram of a processing method for automatically generating machining features according to FIG. 1.

Refer to FIGS. 1 and 2. FIG. 1 is a schematic diagram of a processing system 10 for automatically generating machining features according to an embodiment of the present disclosure. FIG. 2 is a schematic diagram of a processing method for automatically generating machining features according to FIG. 1. Descriptions of the symbols and designations of relevant elements disclosed below can be obtained reference to FIGS. 1, 2 and 5.

According to an embodiment of the present disclosure, the processing system 10, such as a CAD/CAM machining path programming software and a computer related equipment, includes a blank body identification module 20, a geometric data analysis module 30, a machining tool analysis module 40, a cutting simulation module 50 and a tool database 60. The blank body identification module 20 is used to obtain a workpiece CAD file 11 to perform a CAD numerical analysis 101 on a blank body 100. According to the numerical analysis, a continuous area is converted into discrete subareas using grid discretization or decomposed into a finite number of triangular subareas using a finite element method.

The workpiece CAD file 11 may include the physical data, surface data and line data of a workpiece 110. The physical data includes the volume, coordinates and surface relevance of the workpiece 110. The surface data includes the area, normal vector, coordinates and edge correlation of the processing surface. The line data includes the end points, coordinates and adjacent surfaces of the edges of the workpiece 110.

Refer to FIGS. 1 and 2. After the processing system 10 obtains a workpiece CAD file 11, in step S1, the corresponding spatial data and numeric data of the blank body 100 are calculated by the blank body identification module 20 according to a workpiece CAD appearance. In step S2, with the workpiece CAD file 11 being used as a target, the workpiece CAD appearance is compared with the blank body 100 to obtain a feature identification result of a first to-be-processed blank body, wherein the feature identification result of the first to-be-processed blank body 100 includes identifying data of a to-be-removed blank body 100a (represented by slashes) and a feature of a first processing surface 111.

In step S3, the surface data of the workpiece CAD file 11 is compared with the spatial data of the first to-be-processed blank body 100 to obtain the scope and feature of the first processing surface 111. The feature of the first processing surface 111 includes the type, normal vector, coordinate range, curvature, intersecting surface, and edge relevance of the processing surface. In step S4, a geometric analysis 102 is performed by the geometric data analysis module 30 according to the feature of the first processing surface 111, wherein the geometric analysis 102 includes obtaining at least one of the geometric pattern data 112, 113 and 114 including the bottom area, bottom classification, sidewall right angle and curvature of the first processing surface.

In step S5, a tool data is selected from the tool database 60 by the machining tool analysis module 40 to confirm a tool selection range for processing the first processing surface of the blank body 100. That is, different processing surface features correspond to different tool selection ranges. Also, in step S6, a virtual cutting simulation 103 is performed on the first processing surface 111 by the cutting simulation module 50 according to the selected tool to generate data of a processed area 115 and data of an unprocessed area 116.

In step S7, a spatial coordinate mapping comparison 105 between the data of the unprocessed area 116 and the surface data of the workpiece CAD file 11 is performed by the blank body identification module 20 to obtain a feature identification result of a second to-be-processed blank body 100, wherein the feature identification result of the second to-be-processed blank body 100 includes identifying a processable residual area feature.

According to the processing method and system of the present embodiment, an appearance of the blank body 100 is compared with the surface data of the workpiece CAD file 11 through the CAD numerical analysis 101, the processing surface geometric analysis 102, the cutting simulation analysis 103 and the unprocessed area residual feature analysis 104 to obtain a feature identification result of a first to-be-processed blank body 100, then the data of an unprocessed area 116 is further compared with the surface data of the workpiece CAD file 11 to obtain a feature identification result of a second to-be-processed blank body 100. Then, the CAD/CAM based machining path programming software of the processing system 10 further plans a machining path for automatically generating a machining process 51 corresponding to the machining path according to the feature identification result of the first to-be-processed blank body 100 and the feature identification result of the second to-be-processed blank body 100.

In comparison to the conventional method for manually selecting the feature selection, the processing system 10 and method of the present embodiment possess the function of automatically selecting machining features, not only resolving the problem of tool-lifting efficiency caused by the blank reference but also providing suitable tool analysis as a machining basis for automatically generating the machining process 51.

Figure 3:
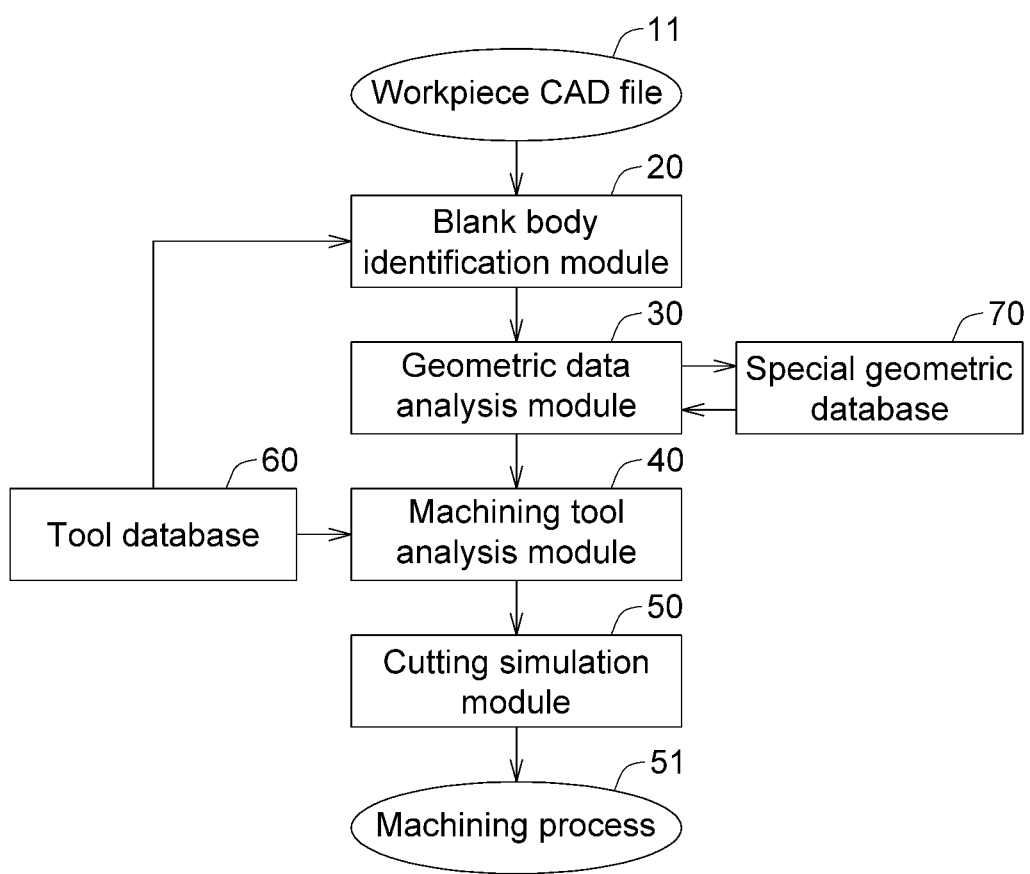
FIG. 3 is a schematic diagram of a processing system for automatically generating machining features according to another embodiment of the present disclosure.
Figure 4A:
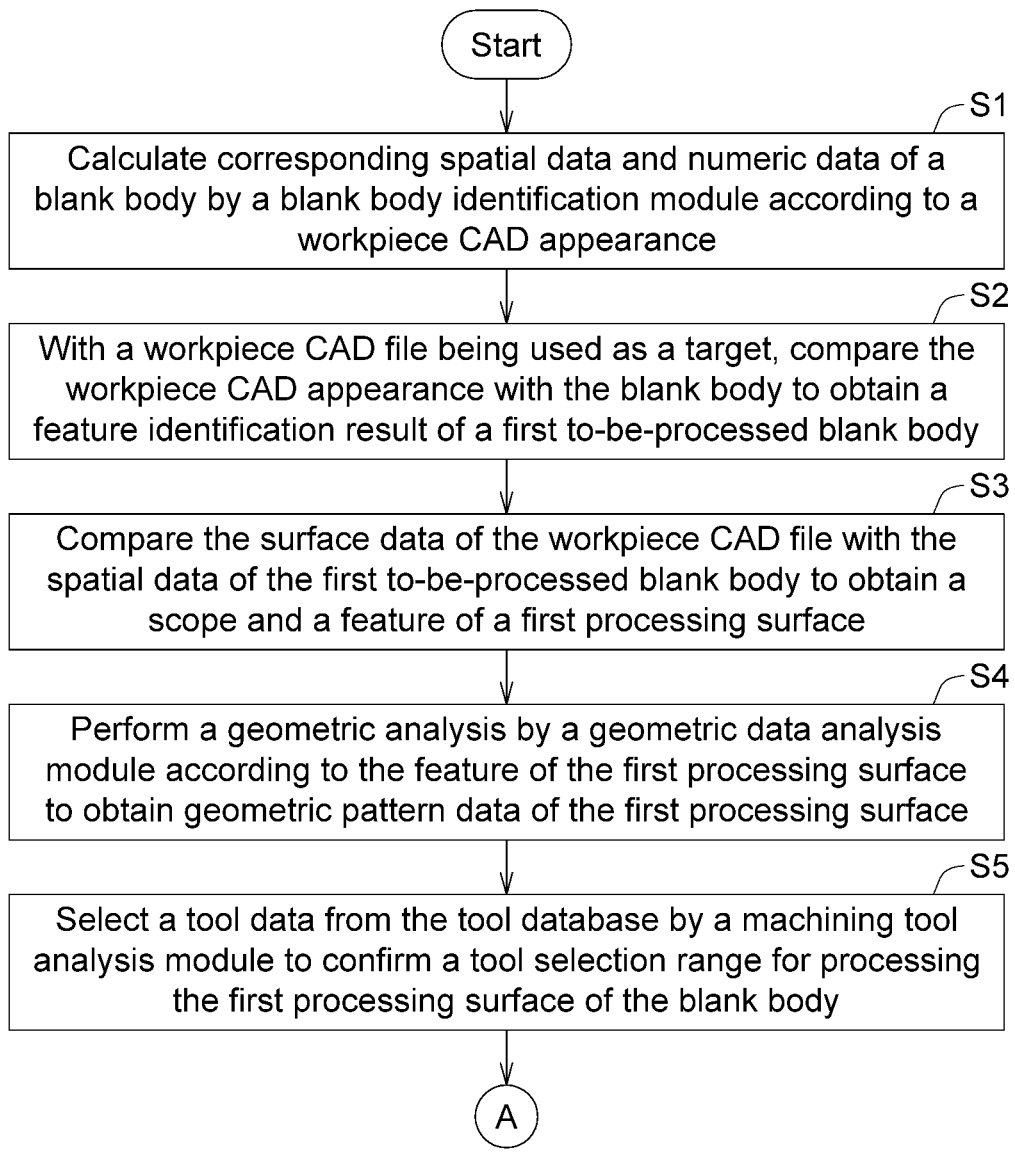
FIGS. 4A and 4B are schematic diagrams of a processing method for automatically generating machining features according to FIG. 3.
Figure 4B:
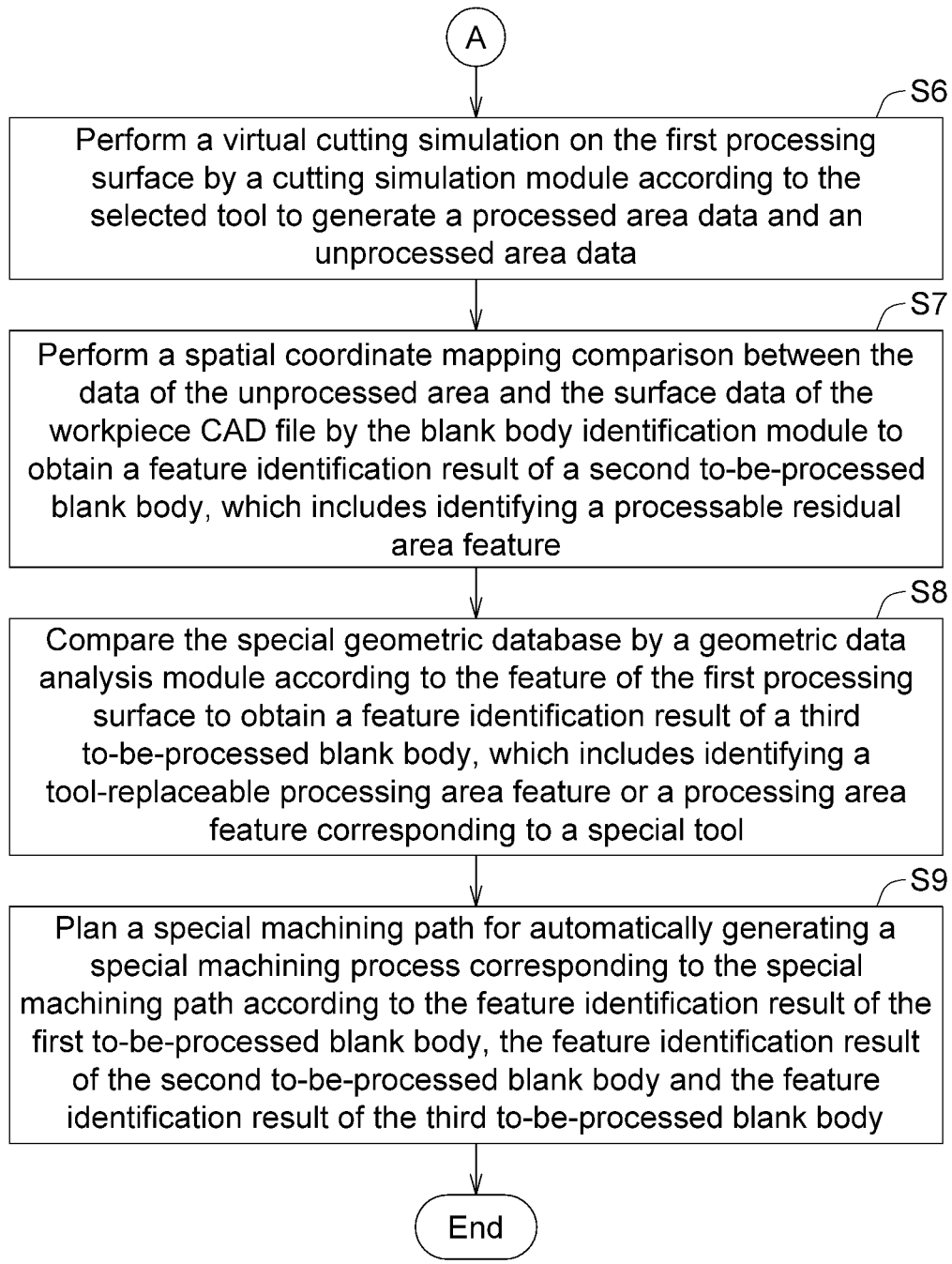

Refer to FIG. 3 and FIGS. 4A and 4B. FIG. 3 is a schematic diagram of a processing system 10' for automatically generating machining features according to another embodiment of the present disclosure. FIGS. 4A and 4B are schematic diagrams of a processing method for automatically generating machining features according to FIG. 3.

The processing system 10' of the present embodiment is similar to the processing system 10 of the above embodiment except that the processing system 10' of the present embodiment further includes a special geometric database 70 in addition to the blank body identification module 20, the geometric data analysis module 30, the machining tool analysis module 40, the cutting simulation module 50 and the tool database 60. The special geometric database 70 stores the special geometric pattern data. The geometric data analysis module 30 compares the tool database 60 with the special geometric database 70 according to the first processing surface feature 111 to obtain a feature identification result of a third to-be-processed blank body 100, wherein the feature identification result of the third to-be-processed blank body 100 includes identifying a tool-replaceable processing area feature or a processing area feature corresponding to a special tool.

As indicated in FIGS. 4A and 4B, the processing method further includes step S8 and step S9 in addition to steps S1 to S7 disclosed above. In step S8, the special geometric processed area analysis includes comparing the special geometric database 70 by the geometric data analysis module 30 according to the feature of the first processing surface 111 to obtain a feature identification result of a third to-be-processed blank body 100, wherein the feature identification result of the third to-be-processed blank body 100 includes identifying a tool-replaceable processing area feature or a processing area feature corresponding to a special tool to determine whether to perform a tool replacement process. Therefore, the machining tool analysis module 40 can select the tool according to the result of special geometric analysis. For example, the end milling cutter can be replaced with a flat milling cutter, a round nose milling cutter, a ball milling cutter, or other special purpose cutter to perform a special machining process.

In step S9 as indicated in FIG. 4B, the CAD/CAM based machining path programming software of the processing system 10' plans a special machining path (or a special machining process) for automatically generating a special machining process 51 corresponding to a special machining path (or special machining process) according to the feature identification result of the first to-be-processed blank body 100, the feature identification result of the second to-be-processed blank body 100 and the feature identification result of the third to-be-processed blank body 100.

Figure 5:
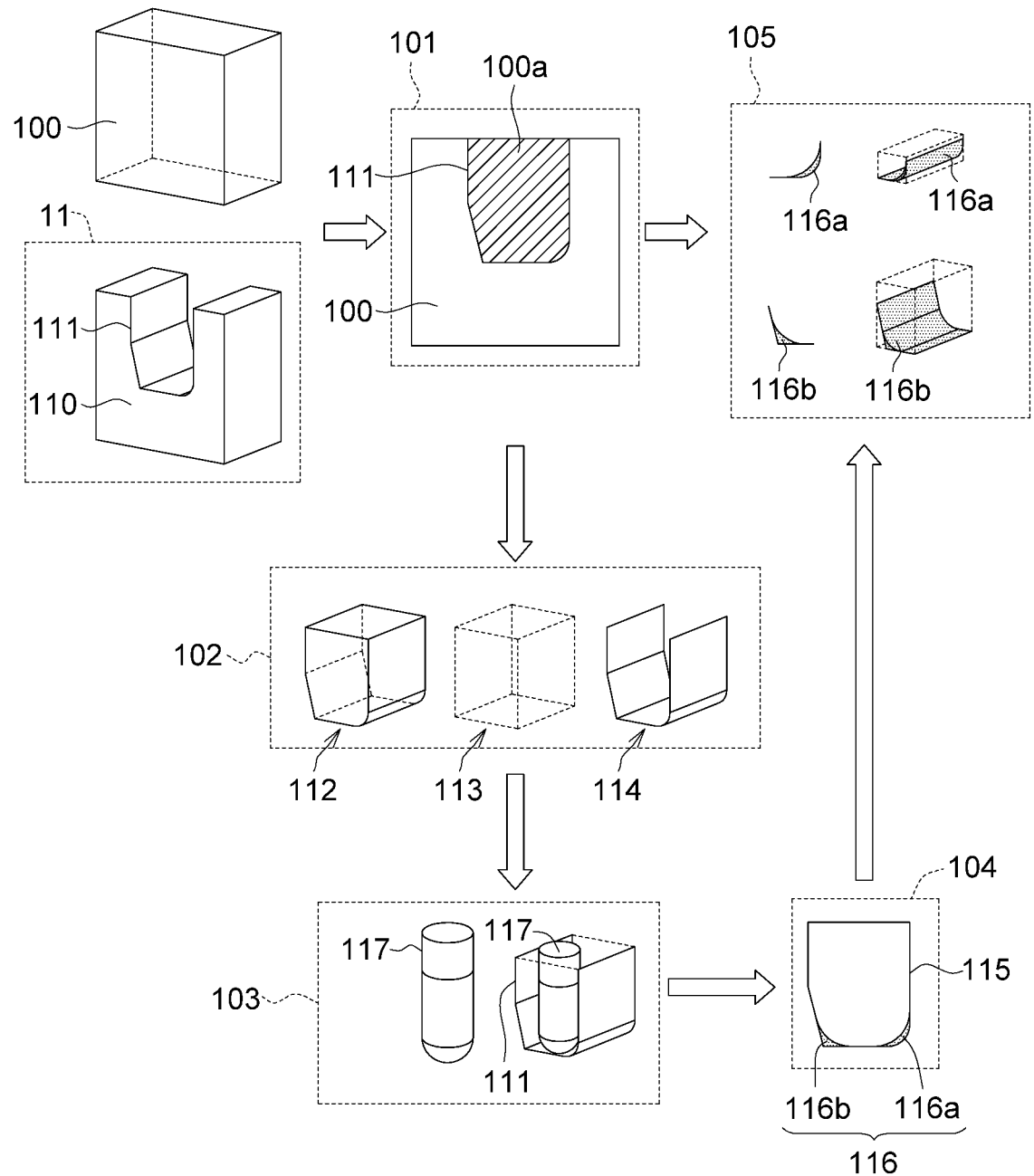
FIG. 5 is a schematic diagram of a system for automatically generating machining features according to an embodiment of the present disclosure.

Referring to FIG. 5, a schematic diagram of a system for automatically generating machining features according to an embodiment of the present disclosure is shown. As indicated by the arrows, the steps for automatically generating machining features include a CAD numerical analysis 101, a processing surface geometric analysis 102, a cutting simulation analysis 103, an unprocessed area residual feature analysis 104 and a spatial coordinate mapping comparison 105.

As indicated in FIG. 5, the blank body 100 can be formed by a workpiece blank, which corresponds to a workpiece CAD appearance. The CAD numerical analysis 101 can be performed to obtain the spatial data of the workpiece blank according to the maximum tolerance range of the blank body 100 obtained through the calculation of the physical data and surface data of the workpiece CAD appearance. As disclosed in step S1, the spatial data and numeric data of the corresponding blank body 100 are calculated according to the workpiece CAD appearance. Then, in step S2, with the workpiece CAD file 11 being used as a target, the workpiece CAD appearance is compared with the blank body 100 to obtain a feature identification result of a first to-be-processed blank body 100, wherein the feature identification result of the first to-be-processed blank body 100 includes identifying data of a to-be-removed blank body 100a (the slashed area represents the scope of the to-be-removed blank body 100a).

The first processing surface 111 can be a bottom surface of a groove and/or a vertical sidewall. The processing surface geometric analysis 102 includes obtaining the geometric pattern data 112, 113 and 114, such as the physical data, surface data and line data of the to-be-processed first processing surface 111. As disclosed in step S3, the surface data of the workpiece CAD file 11 is compared with the spatial data of the first to-be-processed blank body 100 to obtain the scope and feature of the first processing surface 111. The feature of the first processing surface 111 includes the type, normal vector, coordinate range, curvature, intersecting surface, and edge relevance of the processing surface.

The tool 117 can be a milling cutter, such as an end milling cutter, a flat milling cutter, a round nose milling cutter, a ball milling cutter, or other special purpose cutter. According to the cutting simulation analysis 103, the tool 117 suitable for processing the first processing surface of the blank body 100 is selected, and a virtual cutting simulation is performed on the first processing surface 111 by the selected tool 117 to generate data of a processed area 115 and data of an unprocessed area 116 (as disclosed in step S6). The processed area 115 is the first processing surface that has been removed, and the unprocessed area 116 is the first processing surface that has not been removed after the spatial coordinate mapping comparison 105 is performed, that is, the unprocessed area 116 is a residual area.

As indicated in step S7, according to the residual feature analysis 104 of the unprocessed area 116, a spatial coordinate mapping comparison 105 between the data of the unprocessed area 116 and the surface data of the workpiece CAD file 11 is performed to obtain an identification result. If the identification result determines that the unprocessed area 116 is a processable residual area, a suitable tool 117 is selected by the machining tool analysis module 40 and a virtual cutting simulation is performed to the unprocessed area 116 by the selected tool 117, wherein the result of the virtual cutting simulation is used as a machining basis for automatically generating a machining process 51.

In FIG. 5, when the unprocessed area 116a is determined as a processable residual area, a tool data is selected according to the feature of the processable residual area to confirm a selected tool 117 for performing a second processing on the processable residual area. For example, the tool selection range can be changed to a round nose milling cutter or a ball milling cutter from an end milling cutter to plan a tool replacement process for the second machining process. Moreover, if the unprocessed area 116b is determined as a processable residual area, the tool selection range can be changed to a flat milling cutter from an end milling cutter according to the appearance of the residual area to plan a tool replacement process for the second machining process.

According to the processing method and the system for automatically generating machining features disclosed in above embodiments of the present disclosure, a residual numerical analysis is performed on an unprocessed residual area to determine whether the residual area has a processable residual area feature. Conventionally, path planning is based on the simulation residual of the previous process. However, when the resolution of residual operation and the feature of previous tool are insufficient, the generated machining path has an insufficient level of consistency, and the machining process has an insufficient degree of automation and affects the efficiency of the manufacturing process. For example, the tool is lifted repeatedly, the surface pattern is poor, and the tool lifting time is too long. The processing method and system for automatically generating machining features of the present disclosure can overcome the problems encountered in the automation and optimization of path programming and meet the requirements of machining cost and production efficiency.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A processing method for automatically generating machining features, wherein the processing method is performed by a processing system and comprises:
  obtaining a workpiece CAD file to perform a CAD numerical analysis on a blank body;
  with the workpiece CAD file being used as a target, comparing a workpiece CAD appearance with the blank body to obtain a feature identification result of a first to-be-processed blank body, wherein the feature identification result of the first to-be-processed blank body comprises identifying data of a to-be-removed blank body and a feature of a first processing surface;
  performing a geometric analysis on the feature of the first processing surface and determining a tool selection range;
  performing a virtual cutting simulation on the first processing surface according to the tool selection range to generate a processed area data and an unprocessed area data;

performing a spatial coordinate mapping comparison between the unprocessed area data and a surface data of the workpiece CAD file to obtain a feature identification result of a second to-be-processed blank body; and performing a comparison between the feature of the first processing surface and a special geometric database to obtain a feature identification result of a third to-be-processed blank body, wherein the feature identification result of the third to-be-processed blank body comprises identifying a tool-replaceable processing area feature or a processing area feature of a special tool.

2. The processing method according to claim 1, further comprises planning a machining path for automatically generating a machining process corresponding to the machining path according to the feature identification result of the first to-be-processed blank body and the feature identification result of the second to-be-processed blank body.

3. The processing method according to claim 1, wherein the identification of the feature of the first processing surface comprises comparing a spatial data of the first to-be-processed blank body with the surface data of the workpiece CAD file to obtain a scope and the feature of the first processing surface.

4. The processing method according to claim 1, wherein the geometric analysis comprises obtaining at least one of geometric pattern data comprising a bottom area, a bottom classification, a right angle of a side wall and a curvature of the first processing surface.

5. The processing method according to claim 1, wherein the confirmation of the tool selection range comprises selecting a tool data stored in a tool database to confirm a selected tool for processing the first processing surface of the blank body.

6. The processing method according to claim 1, wherein the feature identification result of the second to-be-processed blank body comprises identifying a processable residual area feature.

7. The processing method according to claim 1, wherein when it is determined that the unprocessed area data corresponds to a processable residual area, a tool data is selected according to the processable residual area feature to confirm a selected tool for performing a second processing on the processable residual area.

8. The processing method according to claim 1, further comprising planning a special machining path for automatically generating a special machining process corresponding to the special machining path according to the feature identification result of the first to-be-processed blank body, the feature identification result of the second to-be-processed blank body and the feature identification result of the third to-be-processed blank body.

9. A processing system for automatically generating machining features, comprising:
a blank body identification module, performed by a software executed by the processing system and having a first input end and a first output end, used to obtain a workpiece CAD file to perform a CAD numerical analysis on a blank body, and with the workpiece CAD file being used as a target, to compare a workpiece CAD appearance with the blank body to obtain a feature identification result of a first to-be-processed blank body, wherein the feature identification result of the first to-be-processed blank body comprises identifying data of a to-be-removed blank body and a feature of a first processing surface;

a geometric data analysis module, performed by the software and having a second input end connected to the first output end and a second output end, configured to perform a geometric analysis according to the feature of the first processing surface;

a machining tool analysis module, performed by the software and having a third input end connected to the second output end and a third output end, configured to confirm a tool selection range for processing the first processing surface; and a cutting simulation module, performed by the software and having a fourth input end connected to the third output end and a fourth output end, configured to perform a virtual cutting simulation on the first processing surface according to the tool selection range to generate a processed area data and an unprocessed area data;

wherein, the blank body identification module performs a spatial coordinate mapping comparison between the unprocessed area data and a surface data of the workpiece CAD file to obtain a feature identification result of a second to-be-processed blank body, wherein the blank body identification module performs a comparison between the feature of the first processing surface and a special geometric database to obtain a feature identification result of a third to-be-processed blank body, wherein the feature identification result of the third to-be-processed blank body comprises identifying a tool-replaceable processing area feature or a processing area feature of a special tool.

10. The processing system according to claim 9, wherein the processing system further comprises planning a machining path for automatically generating a machining process corresponding to the machining path according to the feature identification result of the first to-be-processed blank body and the feature identification result of the second to-be-processed blank body.

11. The processing system according to claim 9, wherein the identification of the feature of the first processing surface comprises comparing spatial data of the first to-be-processed blank body with the surface data of the workpiece CAD file to obtain a scope and the feature of the first processing surface.

12. The processing system according to claim 9, wherein the geometric analysis comprises obtaining at least one of geometric pattern data comprising a bottom area, a bottom classification, a right angle of a side wall and a curvature of the first processing surface.

13. The processing system according to claim 9, wherein the confirmation of the tool selection range comprises selecting a tool data stored in a tool database to confirm a selected tool for processing the first processing surface of the blank body.

14. The processing system according to claim 9, wherein the feature identification result of the second to-be-processed blank body comprises identifying a processable residual area feature.

15. The processing system according to claim 14, when it is determined that the unprocessed area data corresponds to a processable residual area, a tool data is selected according to the processable residual area feature to confirm a selected tool for performing a second processing on the processable residual area.

16. The processing system according to claim 9, wherein the processing system further comprises planning a special machining path for automatically generating a special machining process corresponding to the special machining path according to the feature identification result of the first to-be-processed blank body, the feature identification result of the second to-be-processed blank body and the feature identification result of the third to-be-processed blank body.

* * * * *